United States Patent
Blanc et al.

(10) Patent No.: US 10,040,238 B2
(45) Date of Patent: Aug. 7, 2018

(54) GLAZING COMPRISING A SEAL PORTION WITH A CLOSED INSERT AND METHOD FOR PRODUCING THE GLAZING

(71) Applicant: SAINT-GOBAIN GLASS FRANCE, Courbevoie (FR)

(72) Inventors: Olivier Blanc, Tracy le Mont (FR); Laurent Lamoureux, Ribecourt-Dreslincourt (FR); Marie-Camille Attard, Margny-les-Compiegne (FR); Bastien Grandgirard, Marqueglise (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 43 days.

(21) Appl. No.: 15/026,277

(22) PCT Filed: Sep. 26, 2014

(86) PCT No.: PCT/FR2014/052422
§ 371 (c)(1),
(2) Date: Mar. 31, 2016

(87) PCT Pub. No.: WO2015/049440
PCT Pub. Date: Apr. 9, 2015

(65) Prior Publication Data
US 2016/0297135 A1    Oct. 13, 2016

(30) Foreign Application Priority Data
Oct. 1, 2013  (FR) .................................... 13 59481

(51) Int. Cl.
*B29C 53/08*    (2006.01)
*B29C 70/76*    (2006.01)
(Continued)

(52) U.S. Cl.
CPC ........ *B29C 53/08* (2013.01); *B29C 45/14336* (2013.01); *B29C 45/17* (2013.01);
(Continued)

(58) Field of Classification Search
None
See application file for complete search history.

(56) References Cited

U.S. PATENT DOCUMENTS

| 4,344,250 A | * | 8/1982 | Fahlstrom | ................. A01G 7/06 47/48.5 |
| 4,925,237 A | * | 5/1990 | Bohn | ........................ B60J 10/82 296/216.09 |

(Continued)

FOREIGN PATENT DOCUMENTS

| EP | 2 353 907 A1 | 8/2011 |
| FR | 2 814 705 A1 | 4/2002 |

(Continued)

OTHER PUBLICATIONS

International Search Report as issued in International Patent Application No. PCT/FR2014/052422, dated Dec. 18, 2014.

*Primary Examiner* — Babajide A Demuren
(74) *Attorney, Agent, or Firm* — Pillsbury Winthrop Shaw Pittman LLP

(57) ABSTRACT

A glazing includes a glazed element, at least one profiled seal portion and at least one insert which is located at least partially inside the profiled seal portion, the insert having along a main portion which is in the profiled seal portion, in cross-section, a section which is closed on itself in the form of a loop and which forms a hollow member, wherein the main portion includes at least at one end a stopper which closes the end.

15 Claims, 3 Drawing Sheets

(51) Int. Cl.
  *B60J 1/02* (2006.01)
  *B29C 45/14* (2006.01)
  *B29C 45/17* (2006.01)
  *B29C 65/50* (2006.01)
  *B29C 70/24* (2006.01)
  *B29K 309/08* (2006.01)
  *B29K 677/00* (2006.01)
  *B29K 705/00* (2006.01)
  *B29L 31/30* (2006.01)

(52) U.S. Cl.
  CPC ............ *B29C 65/50* (2013.01); *B29C 70/763* (2013.01); *B60J 1/02* (2013.01); *B29C 45/14434* (2013.01); *B29C 70/24* (2013.01); *B29C 2045/1486* (2013.01); *B29K 2309/08* (2013.01); *B29K 2677/00* (2013.01); *B29K 2705/00* (2013.01); *B29L 2031/30* (2013.01)

(56) References Cited

U.S. PATENT DOCUMENTS

| | | | | |
|---|---|---|---|---|
| 6,273,500 B1 * | 8/2001 | Boersma | ................ | B60J 10/82 296/216.09 |
| 6,454,884 B1 * | 9/2002 | McNulty | ................ | B60J 5/0437 148/520 |
| 7,140,676 B2 * | 11/2006 | Schonebeck | ............. | B60J 7/043 296/187.02 |
| 8,182,025 B2 * | 5/2012 | Auchter-Bruening | ..... | B60J 7/04 296/191 |
| 2003/0177702 A1 * | 9/2003 | Hock | ................ | B60J 5/0402 49/502 |
| 2007/0040416 A1 * | 2/2007 | Bordeaux | ......... | B29C 45/14434 296/216.09 |
| 2008/0164695 A1 * | 7/2008 | Schiroky | ................ | F16L 19/08 285/342 |
| 2008/0217935 A1 * | 9/2008 | Braunbeck | ............. | B60R 19/34 293/132 |
| 2012/0292951 A1 * | 11/2012 | De Bie | ............ | B29C 45/14836 296/216.09 |
| 2014/0223743 A1 * | 8/2014 | Frehn | ................ | B60G 21/055 29/897.2 |
| 2015/0027582 A1 * | 1/2015 | Seyr | ................ | E04C 3/07 138/156 |

FOREIGN PATENT DOCUMENTS

| | | | | |
|---|---|---|---|---|
| FR | | 2 948 609 A1 | 2/2011 | |
| WO | WO 2005/014320 A1 | | 2/2005 | |
| WO | WO 2006092128 A1 * | | 9/2006 | ....... B32B 17/10036 |

* cited by examiner

GLAZING COMPRISING A SEAL PORTION WITH A CLOSED INSERT AND METHOD FOR PRODUCING THE GLAZING

CROSS-REFERENCE TO RELATED APPLICATIONS

This application is the U.S. National Stage of PCT/FR2014/052422, filed Sep. 26, 2014, which in turn claims priority to French Application No. 1359481, filed Oct. 1, 2013. The contents of all of these applications are incorporated herein by reference in their entirety.

The present invention relates to a glazing which is provided with a seal portion which is reinforced by an insert and more specifically by an insert which has, inside the seal portion, a hollow member.

The present invention also relates to the method for producing such a glazing.

The present invention thus relates to a glazing comprising a glazed element, at least one profiled seal portion and at least one insert which is located at least partially inside the profiled seal portion, the insert having along a main portion which is in the profiled seal portion, in cross-section, a section which is closed on itself in the form of a loop and which forms a hollow member. The loop in question is not necessarily completely closed on itself but the hollow member thus formed is sufficiently pronounced that it presents the problem of the filling thereof by the seal material when this material is injected.

This is because the prior art knows from the international patent application N° WO 2005/014320, and in particular from FIGS. 4a, 4b, 6, 7, 9b, configurations of inserts for seal portions which have along a main portion, in cross-section, a section which is closed on itself in the form of a loop and which forms a hollow member and the filling of this hollow member by seal material may present a dual problem:

a problem of instability in the production method as a result of the fact that the hollow member (or the hollow members if there are a plurality) is/are difficult to fill with the injected material; the progression of the fluid material, the adhesion thereof to the walls of the hollow member and the final quantity are parameters which are difficult to control and this brings about a lack of repeatability from one glazing to another; this instability leads to the skin of the profiled seal portion sometimes not being smooth, but instead pleated or sometimes rough or with bubbles, in particular close to the insert;

a problem with respect to reliability of positioning of the insert with respect to the glazed element when one (or more) hole(s) in the insert is/are used for the positioning thereof in the mold since the arrival of seal material in the region of this/these holes via the inner side of the hollow member can modify the positioning of the insert.

It is important to note that the origin of these two problems was difficult to detect; since it is a complex production method, with a very large number of parameters, it was necessary to carry out a very large number of tests before realizing that it originated from the filling of the hollow member(s) of the insert.

Furthermore, the seal material present in the hollow member was presumed to have a beneficial effect on the mechanical strength of the assembly comprising the glazed element/seal portion/insert.

The present invention thus relates to a solution in which a stopper is arranged at one or at each end of the insert which has a hollow member, in order to prevent the material of the profiled seal portion from being introduced into the hollow member(s). In this manner, there is no longer any uncertainty with regard to the volume which is effectively filled by the material of the profiled seam which is injected into the mold and the surface of this seam is always homogeneous.

Indeed, after numerous tests, the inventors have understood that it could be more advantageous to close the end (or the ends) in the form of hollow members of an insert so that the material of the seal is not introduced at all into the hollow member(s) of the insert.

They have further understood that the supposed advantages of the presence of seal material in the hollow member(s) were actually unfounded and the advantages afforded by the closure of the hollow member(s) were ultimately much more important than the advantages of filling this/these hollow member(s).

The present invention thus relates to a glazing according to claim 1. This glazing comprises a glazed element, at least one profiled seal portion and at least one insert which is located at least partially inside the profiled seal portion, said insert having along a main portion which is in said profiled seal portion, in cross-section, a section which is closed on itself in the form of a loop and which forms a hollow member; according to the invention, said main portion comprises at least at one end, and preferably at two opposing ends, a stopper which closes said end and preferably said ends. The stopper thus closes said end completely. In this manner, the material of said profiled seal portion is not introduced into the hollow member.

The present invention thus proposes a solution when a portion of a main insert, called in this instance the "main portion", is completely in said profiled seal portion, that is to say that the material of this profiled seal portion is present all around the outer contour of the insert, along this main portion.

The present invention also proposes a solution when said profiled seal portion is not present all around the outer contour of the profile-member, along a main portion, but is present around three sides of the outer contour of the profile-member. For example, the present invention proposes a solution when the insert is arranged, directly or via an adhesive coating, on a face of the glazed element, thus with one side of the insert which is directly or indirectly in contact with the glazed element and said profiled seal portion which is present around the remainder of the outer contour of the insert.

The present invention thus proposes a general solution when an insert has a hollow member, that is to say, along a main portion, when the cross-section of the insert is observed, the material of said profiled seal portion is present around at least two sides of the outer contour of the insert, or around three sides, or all around the outer contour of the insert, and is also capable of being present inside this outer contour.

The present invention is therefore intended to prevent the material of said profiled seal portion from being present inside this outer contour of the insert.

The stopper according to the invention is preferably positioned a longitudinal end of an insert so that the material of the profiled seam cannot be introduced at all; however, it is also possible to position a stopper without a head so that there is still a small hollow member at an end but with limited volume (at the most a few $cm^3$).

In order to close said end in the most efficient possible manner, the stopper is preferably a fitted component which has a body which has an outer section which, in particular if a peripheral groove is provided inside the inner face of the hollow member, is equal to or greater than the inner section of said end.

In a variant, said stopper is a fitted component which is U-shaped in longitudinal section in order to reduce the weight of the stopper.

In a specific variant, said stopper is a fitted component which comprises at least one face which is in contact with an inner face of said end and which is in the form of saw teeth so that the stopper is maintained in a compressed state inside the hollow member.

It is possible for the stopper to be a fitted component which has a head which has an outer section which is equal to or greater than the outer section of said end in order to provide a sealed face with respect to the material of said seal portion which is located beyond the end.

In a specific variant, said stopper is a fitted component, which is at least partially of foam material, with the foam material of the stopper which fills the section of said end, preferably without extending beyond said end.

In a very specific variant, said end comprises at least one hole for positioning the insert in the mold for injecting the material of the profiled seal portion, said hole being closed at the inner face of said insert by said stopper.

Preferably, the stopper leaves all the outer periphery of said end uncovered.

It is further possible for the stopper not to be a fitted component, but instead to be integral with the end of the insert. In this manner, the stopper may be formed at the end of the main portion by folding a wing of the insert and welding this wing, in particular when the insert is of plastics material or of metal or metal alloy since these materials may be folded without breaking and may be welded.

The present invention is particularly suitable when the end, and preferably the ends, of the main portion are integrated completely in the profiled seal portion, but it is also suitable when the profiled seal portion is located around only one portion of the end or ends.

It is possible for the main portion to be formed by folding over on itself of a longitudinal plate which is closed along a longitudinal linkage by a weld seam, in particular when the insert is of plastics material or a metal or metal alloy, or by an additional connection means, the connection means preferably being a layer of adhesive or an adhesive tape which is arranged between said insert and a face, and in particular the inner face, of said glazed element.

The present invention also relates to a method for producing a glazing which comprises a glazed element and in particular a glazing according to what has been set out above, said glazing comprising a glazed element, at least one profiled seal portion and at least one insert which is located at least partially inside said profiled seal portion, said insert having along a main portion, which is in the profiled seal portion, in cross-section, a section which is closed on itself in the form of a loop and which forms a hollow member, the method comprising a step of positioning said glazed element and said insert in a mold portion in order to form said profiled seal portion in a cavity of the mold. According to this method, before said insert is positioned in said mold portion, said main portion is closed at least at one end, and preferably at two opposing ends, by a stopper, so that, when the material of said profiled seal portion is injected into said cavity of the mold, this material is not introduced into said hollow member.

The use of a stopper according to the invention in order to hermetically close at least one hollow end of an insert, and preferably all the hollow ends of an insert, is particularly advantageous.

The present invention allows a very reliable connection to be produced between the glazed element, the seal portion and the insert having a hollow portion or portions in spite of the absence or presence of a very small volume of the seal material in this/these hollow portion(s), whilst allowing very good repeatability of the production and therefore an appearance and properties (in particular mechanical strength) which are very similar from one glazing to another in the same series.

Furthermore, the present invention allows the positioning of an insert in a seal portion to be made more reliable when this positioning is carried out by means of at least one hole in the insert.

Furthermore, the absence of seal material in the hollow portion(s) allows seal material to be saved and allows the glazing to be made lighter even taking into consideration the price and weight of the stopper(s). The weight reduction is even more significant if one or more of the hollow stopper(s) is/are used, with the hollow member of the stopper(s) facing the hollow member of the insert. The face of the stopper in contact with the seal portion is preferably planar (non-hollow).

Since the closure of the hollow member(s) of the insert is carried out before the insert is introduced into the production mold of the seal, this step does not have any negative effect on the production rate of the seal on the glazing for a series of glazing.

A plurality of embodiments of the present invention will be described below by way of non-limiting examples, with reference to the appended drawings, in which.

In the schematic Figures, the proportions between the different elements are not precisely complied with in each Figure but instead are complied with from one similar Figure to another and the elements in the background are generally not illustrated, in order to facilitate the reading thereof.

Figure 1:
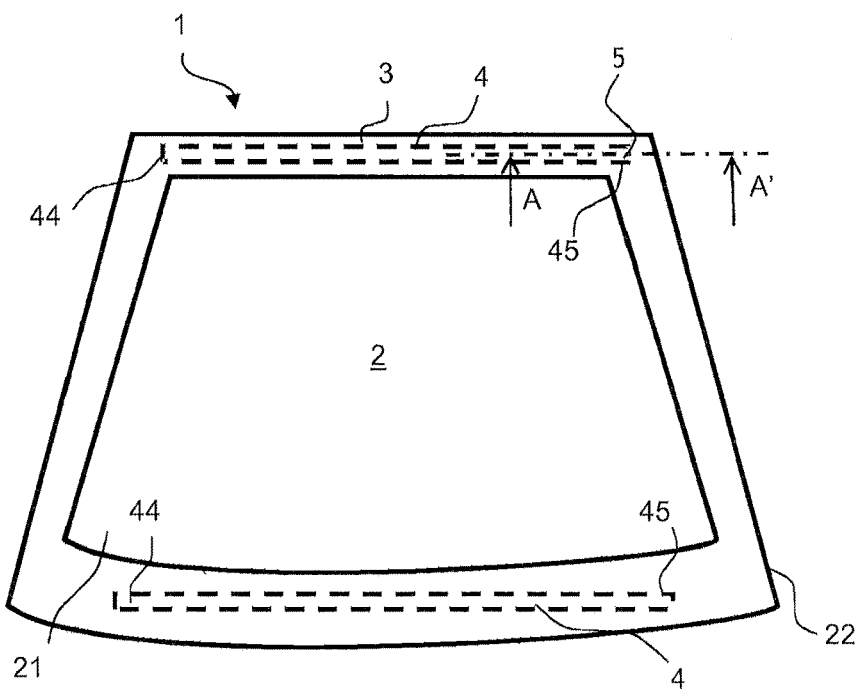
FIG. 1 shows a glazing according to the invention when viewed from the inner side, this glazing comprising two inserts which are completely integrated in the seal portion and which, although normally invisible, are indicated with dotted lines.

FIG. 1 illustrates the production of a vehicle glazing 1 according to the invention, comprising a glazed element 2 and a profiled seal portion 3.

The glazing 1 is intended to close a structural opening which produces a separation between an inner space of the vehicle and an outer space with respect to the vehicle. The glazed element 2 thus has an inner face 21 which is intended to be directed toward the inner space, an outer face 23 which is intended to be directed toward the outer space and a peripheral edge 22.

In this manner, when the terms "inner" and "outer" are referred to in the present document, it is always with reference to this consideration.

The glazed element may be monolithic, that is to say, constituted of a single sheet of material, or be composite, that is to say, constituted of a plurality of sheets of material between which there is inserted at least one layer of adhesive material in the case of laminated glazing. The sheet(s) of material may be mineral, in particular of glass, or organic, in particular of plastics material.

In the case of a glazing for a vehicle, the glazing generally has at least partially at the periphery thereof, all around the edge of the inner face 21, a decorative strip (not illustrated). This decorative strip generally results from a deposit of enamel, produced on the inner face of the glazed element when it is monolithic or on an interposed face of the glazing for composite glazing, but it may also result from partial and/or peripheral coloring of a sheet of material used, in particular a sheet of organic material.

When the glazed element is of organic material, it has been produced prior to the implementation of the invention by molding the material which constitutes the glazed element in a molding device which comprises a mold which comprises at least one fixed mold portion and one movable mold portion which can be moved relative to the fixed mold portion, the mold portions cooperating in the closed state of the mold, during the molding step, in order to form a molding cavity which has in cross-section the cross-sectional shape of the glazed element. Often, the glazed element of organic material is not flat, but instead curved.

When the glazed element is of mineral material, it has been produced prior to the implementation of the invention by melting mineral material into a planar sheet, then by cutting this sheet and optionally curving and/or tempering this sheet.

For information, the production of a glazed element of organic material in large batches is more troublesome than producing a glazed element of mineral material and the first production method is generally selected when the shape of the glazed element is so complex that it cannot be produced by curving a glazed element of mineral material.

When the glazed element is a composite glazed element, it has been produced in accordance with the well-known technique for producing multiple glazing or laminated glazing which may optionally be curved.

In FIG. 1, the glazed element 2 is a monolithic glazing. In this instance, it is a fixed glazing for a motor vehicle roof. This glazing has a large extent and that is the main reason for which it comprises at least one insert 4.

The profiled seal portion 3 adheres to the inner face 21 of the glazed element and is located over the entire periphery of this inner face.

This profiled seal portion 3 comprises two inserts 4: one located at the front portion of the glazing, the other at the rear portion of the glazing, relative to the forward direction of the vehicle; these two inserts each have an elongate form and are orientated substantially in the Y axis of the vehicle.

Each insert is shorter than the width of the glazing at the end at which it is located so that the two longitudinal ends 44, 45 thereof are in the profiled seal portion 3.

Figure 2:
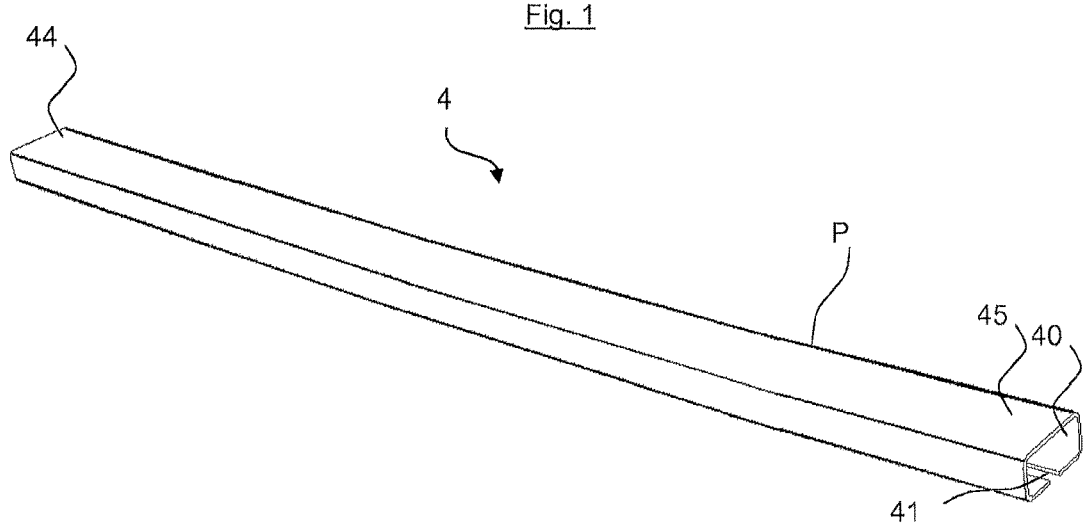
FIG. 2 is a perspective view of the insert which is at the top of FIG. 1 and which is produced in this instance by folding a metal strip over on itself.

FIG. 2 shows the insert 4 which has been produced from a planar plate of metal or metal alloy which has been folded four times, each time along a longitudinal fold and at a right angle, in order to substantially form an elongate linear block which is open at the two ends 44 and 45 thereof. This insert thus comprises a hollow member 40 which is located between the walls of the insert which are closed on themselves.

Figure 3:
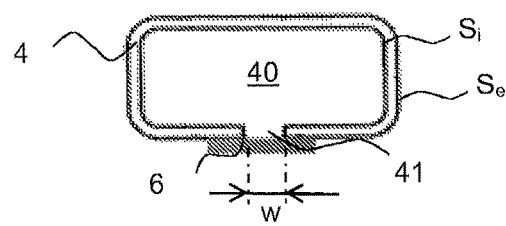
FIG. 3 is a schematic front view of an end of the insert of FIG. 2 further having a means for closing a longitudinal aperture of this insert.

As can be seen more specifically in FIG. 3, the insert 4 thus has in cross-section the form of a rectangular loop, with four rounded corners. One side of the rectangle is not complete: a longitudinal aperture 41 is located along the entire length of the insert, between the two longitudinal edges which have been folded one toward the other The width w of this aperture 41 is in the order of from 0.5 to 5 mm, for example, 2 mm.

A weld seam or an additional connection means 6 closes the longitudinal aperture 41 arising from the connection of the longitudinal edges after the folds.

The following description is given with reference to the insert which is located at the top of FIG. 1, but is applied to any type of insert which has along a main portion P located inside the profiled seal portion 3, in cross-section, a section which is closed on itself in the form of a loop and which forms a hollow member 40.

In connection with FIG. 1, it should be understood that, in the variant illustrated, the profile of the insert 4 is the same over the entire length thereof; the main portion P is therefore the whole of the insert 4.

However, it is not excluded that the insert according to the invention may have one (or more) other portion(s) which is/are not illustrated and which protrude(s) partially or completely outside of the profiled seal portion; for example, the insert may comprise one (or more) wing(s) which is (are) partially or completely outside the profiled seal portion, in order to allow the glazing to slide, and/or to allow it to be fixed to the bodywork, or to allow an accessory to be fixed to the glazing.

The material of the insert 4 may be:
- a stainless steel or
- a steel which is treated against corrosion (but not necessarily with a cataphoresis, for example, by means of pre-zincing) or
- a plastics material which is optionally reinforced with a load, such as, for example, a polyamide which is charged with glass fibers (for example, PA66FV).

When the stopper 5 is a fitted component, as for the variants of FIGS. 4 to 7, this stopper has a member 50 which has an outer section equal to the inner section $S_i$ of the end 45. This fitted stopper 5 must hermetically close the end 45 so that the material of the profiled seam cannot be introduced into the hollow member 40 when this material is injected, even though this injection is carried out under pressure.

Figure 4:
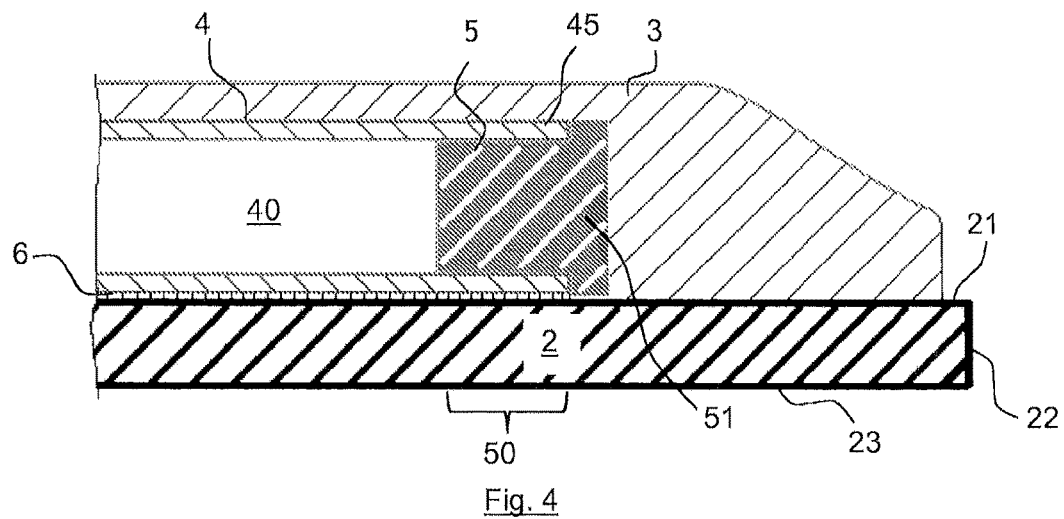
FIG. 4 is a schematic partially sectional view along A-A' of FIG. 1 of the closure of an insert using a solid stopper with a planar head according to the invention.

In the variant of FIG. 4, the stopper 5 is solid: the body 50 fills all the inner space of the end 45.

In this variant, the stopper 5 further has a head 51 which has an outer section which is greater than the outer section $S_e$ of the end 45.

In this manner, the stopper has a shape which is closer to the shape of a champagne cork than that of a wine cork; the closure of the end 45 is thus more hermetic than if there were no head since, when the material of the profiled seam is injected under pressure, this material presses the head 51 against the end 45 and this force further increases the sealing.

The variant of FIG. 4 is further distinguished from the other variants in that there is no material of the profiled seal in the space located precisely between the insert and the inner face of the glazed element.

This FIG. 4 illustrates the use of the connection means 6 in the form of a layer of adhesive or a double-faced adhesive tape which is arranged between the lower face of the insert 4 and the inner face 21 of the glazed element 2.

Figure 5:
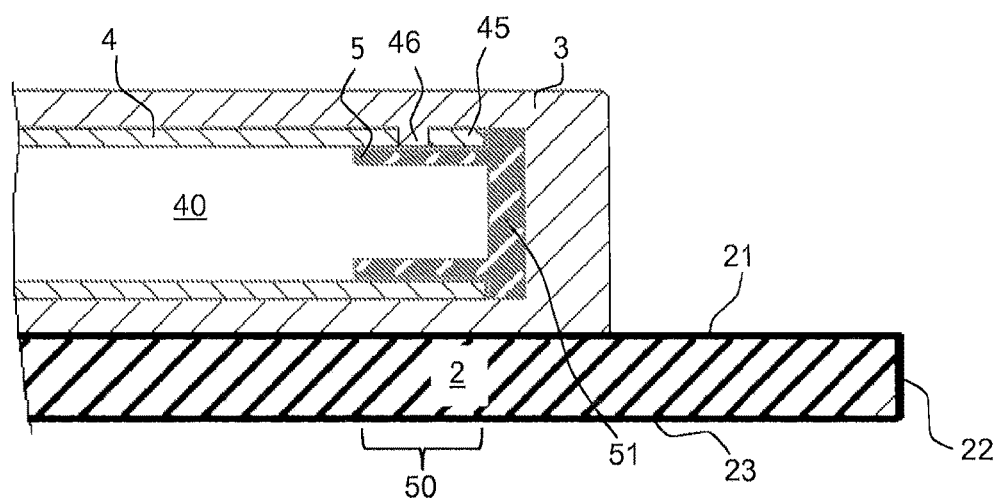
FIG. 5 is a sectional view, similar to that of FIG. 4, of a production variant of the closure of an insert using a hollow stopper with a planar head.

In the variant of FIG. 5, the body 50 of the stopper 5 is not solid so that the stopper is lighter. The stopper 5 is a fitted component which is U-shaped in longitudinal section.

FIG. 5 further shows that the end 45 may comprise at least one hole 46 which is closed at the inner face of the insert by the stopper 5. This hole 46 has served to position the insert in the injection mold when the material of the profiled seal portion is injected. The seal portion 3 does not comprise a mark at the location where the insert has been held during the injection since, when the mold is opened, the material of the seal has become leveled at this location as a result of the fact that it was not yet completely polymerized or hard at this time.

Figure 6:
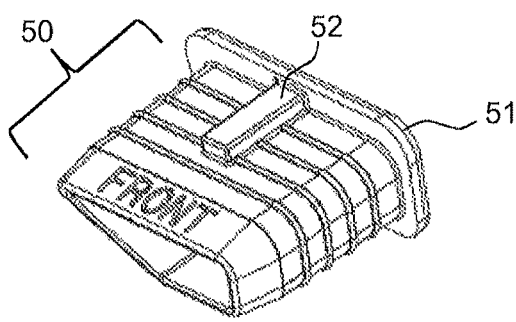
FIG. 6 is a schematic perspective view of the stopper of FIG. 5.

FIG. 6 shows an embodiment of the stopper of FIG. 5 and illustrates that the faces of the body 50 which must come into contact with the inner face of the end 45 are in the form of saw teeth in order to further improve the sealing.

This Figure further shows the presence of an auxiliary member 52 which is pressed in when the stopper is introduced into the end 45 in order to hermetically close the hole 46.

Figure 7:
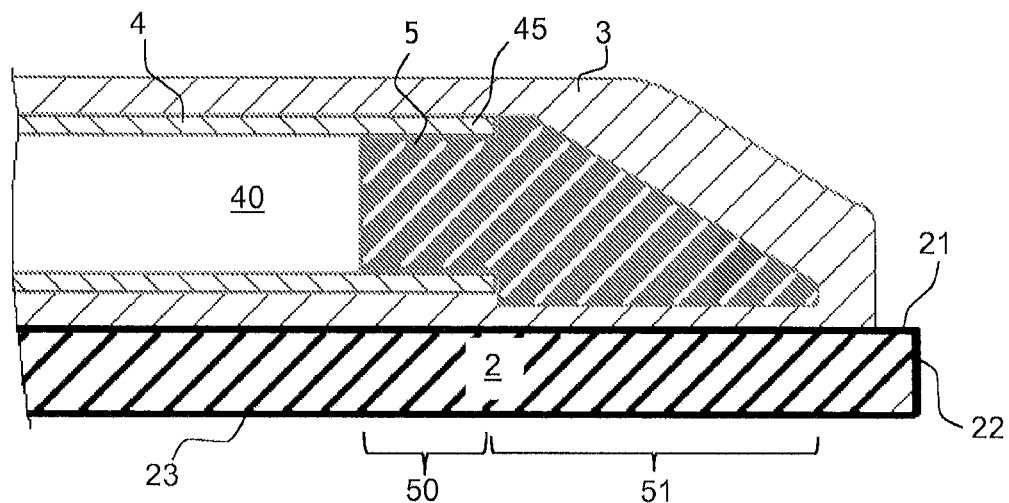
FIG. 7 is a schematic sectional view, similar to that of FIG. 4, of another production variant of the closure of an insert using a solid stopper with a voluminous head.

In the variant of FIG. 7, the head 51 of the stopper 5 is not planar but instead voluminous: the volume thereof substantially follows the surface of the adjacent profiled seal in order to facilitate the flow of the material of the seal into the mold; it is possible for this head 51 not to be solid so that the stopper is lighter.

There is also a variant which has a stopper which is a fitted component and which is not illustrated and in which the stopper is at least partially of foam material. This assembly may, for example, be the equivalent of the body 50 of the above variants which is of foam material, or even the entire stopper. The foam material has to be selected so that the stopper hermetically closes the end so that the material of the profiled seam cannot be introduced into the hollow member when this material is injected.

Figure 8:
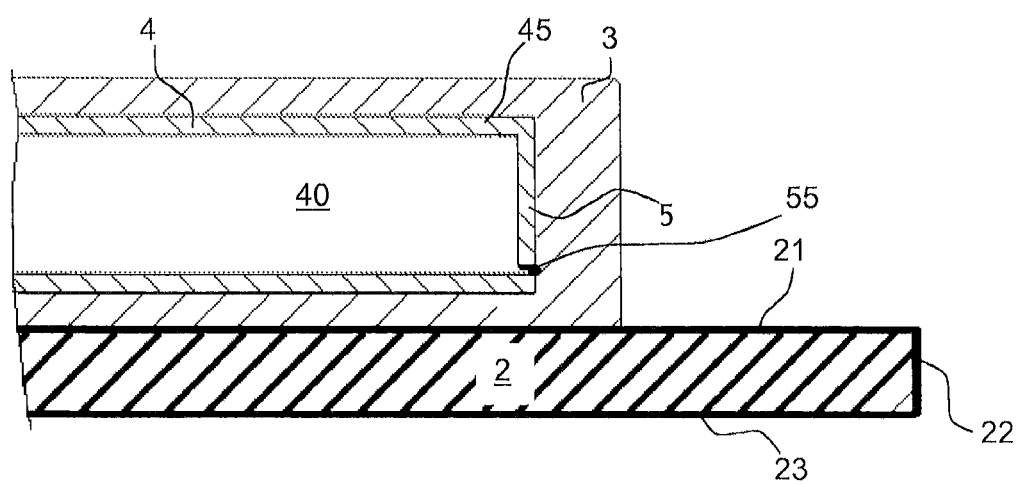
FIG. 8 is a schematic sectional view, similar to that of FIG. 4, of another production variant of the closure of an insert using a weld seam.

FIG. 8 illustrates a specific variant for which the stopper 5 is not a fitted component but is an integral portion of the insert.

Based on the configuration of the insert of FIG. 3, one possibility is to produce an insert which is longer than necessary, then to cut the left and right edges at the end 45 in order to keep only the upper edge in order to form a wing which is then folded at 90° in order to close the hollow member 40, then welded by a weld seam 55 at the inner periphery of the insert in order to hermetically close the end 45 so that the material of the profiled seam cannot be introduced into the hollow member 40 when this material is injected, even when this injection is carried out under pressure.

The stopper according to the invention thus prevents the material of the profiled seal portion from being introduced into the hollow member of the main portion of the insert in a random manner when this material is injected; the stopper according to the invention thus forms a sealed barrier with respect to the material of the profiled seal portion; there is always material of the profiled seal portion against the stopper since it thus forms a portion of the wall of the molding cavity which allows the profiled seal portion to be molded.

In all the variants illustrated, the end 45 is completely integrated in the profiled seal portion 3 so that the entire periphery of the stopper which is not in the insert is integrated in the profiled seal portion 3. However, using the stopper according to the invention, it may be envisaged that only a portion of the periphery of the stopper is integrated in the profiled seal portion 3, whilst this was not possible previously.

The invention claimed is:

1. A glazing comprising a glazed element, at least one profiled seal portion and at least one insert which is located at least partially inside said profiled seal portion, said insert having along a main portion which is in said profiled seal portion, in cross-section, a section which is closed on itself in the form of a loop and which forms a hollow member, wherein said main portion comprises at least at one end, a stopper which closes said end, wherein the main portion is formed by folding over on itself a longitudinal plate which is closed along a longitudinal seal by a weld seam or by an additional connection component, and wherein said insert is arranged directly on a face of the glazed element so that a first side of the insert is directly in contact with said face of the glazed element and said profiled seal portion is present around a remainder of an outer contour of the insert and absent between said first side of the insert and said face of the glazed element, or wherein said insert is arranged indirectly in contact, via an adhesive coating, with said face of the glazed element so that said adhesive coating contacts both said first side of the insert and said face of the glazed element and said profiled seal portion is present around the remainder of the outer contour of the insert and absent from said first side of the insert to said face of the glazed element where the adhesive coating is located.

2. The glazing as claimed in claim 1, wherein said stopper is a fitted component which has a body which has an outer section which is equal to or greater than an inner section of the end.

3. The glazing as claimed in claim 1, wherein said stopper is a fitted component which is U-shaped in longitudinal section.

4. The glazing as claimed in claim 1, wherein said stopper is a fitted component which comprises at least one face which is in contact with an inner face of said end and which is in the form of saw teeth.

5. The glazing as claimed in claim 1, wherein said stopper is a fitted component which has a head which has an outer section which is equal to or greater than an outer section of the end.

6. The glazing as claimed in claim 1, wherein said stopper is a fitted component which is at least partially of foam material, with the foam material of said stopper which fills the section of said end.

7. The glazing as claimed in claim 1, wherein said end comprises at least one hole, the hole being closed at an inner face of said insert by said stopper.

8. The glazing as claimed in claim 1, wherein said stopper is formed at said end of said main portion by folding and welding a wing of said insert.

9. The glazing as claimed in claim 1, wherein said end of said main portion is integrated completely in the profiled seal portion.

10. A method for producing a glazing, the glazing comprising a glazed element, at least one profiled seal portion and at least one insert which is located at least partially inside said profiled seal portion, said insert having along a main portion which is in the profiled seal portion, in cross-section, a section which is closed on itself in the form of a loop and which forms a hollow member, the method comprising positioning said glazed element and said insert in a mold portion in order to form said profiled seal portion in a cavity of said mold, wherein, before said insert is positioned in the mold portion, said main portion is closed at least at one end by a stopper, wherein the main portion is formed by folding over on itself a longitudinal plate which is closed along a longitudinal seal by a weld seam or by an additional connection component, and wherein said insert is arranged directly on a face of the glazed element so that a first side of the insert is directly in contact with said face of the glazed element and said profiled seal portion is present around a remainder of an outer contour of the insert and absent between said first side of the insert and said face of the glazed element, or wherein said insert is arranged indirectly in contact, via an adhesive coating, with said face of the glazed element so that said adhesive coating contacts both said first side of the insert and said face of the glazed element and said profiled seal portion is present around the remainder of the outer contour of the insert and absent from said first side of the insert to said face of the glazed element where the adhesive coating is located.

11. The glazing as claimed in claim 1, wherein said main portion comprises at another end opposite said one end another stopper which closes said other end.

12. The glazing as claimed in claim 11, wherein said one end and said other end of said main portion are integrated completely in the profiled seal portion.

13. The glazing as claimed in claim 1, wherein the additional connection component is a layer of adhesive or an adhesive tape which is arranged between said first side of the insert and said face of the glazed element.

14. The method as claimed in claim 10, wherein before said insert is positioned in the mold portion, said main portion is closed at another end opposite said one end by another stopper.

15. The glazing as claimed in claim 13, wherein the additional connection component forms said adhesive coating.

* * * * *